(12) United States Patent
Guilemond et al.

(10) Patent No.: US 9,434,406 B2
(45) Date of Patent: Sep. 6, 2016

(54) METHOD FOR CONTROLLING END OF TRAVEL FOR ELECTRIC POWER-ASSISTED STEERING

(71) Applicant: JTEKT EUROPE, Irigny (FR)

(72) Inventors: Alain Guilemond, Marennes (FR); Romain Moretti, Soucieu en Jarrest (FR)

(73) Assignee: JTEKT EUROPE, Irigny (FR)

(*) Notice: Subject to any disclaimer, the term of this patent is extended or adjusted under 35 U.S.C. 154(b) by 0 days.

(21) Appl. No.: 14/385,386

(22) PCT Filed: Mar. 12, 2013

(86) PCT No.: PCT/FR2013/050516
§ 371 (c)(1),
(2) Date: Sep. 15, 2014

(87) PCT Pub. No.: WO2013/136009
PCT Pub. Date: Sep. 19, 2013

(65) Prior Publication Data
US 2015/0046037 A1    Feb. 12, 2015

(30) Foreign Application Priority Data
Mar. 15, 2012 (FR) ..................... 12 52324

(51) Int. Cl.
*B62D 5/04* (2006.01)
*B62D 3/12* (2006.01)

(52) U.S. Cl.
CPC ............... *B62D 5/0463* (2013.01); *B62D 3/12* (2013.01); *B62D 5/0469* (2013.01); *B62D 5/0472* (2013.01)

(58) Field of Classification Search
CPC ...... B62D 5/04; B62D 5/0457; B62D 5/046; B62D 5/0463; B62D 5/0469; B62D 5/0472; B62D 5/061

USPC ........ 701/41, 42, 43, 44; 180/404, 402, 421, 180/422, 443, 446
See application file for complete search history.

(56) References Cited

U.S. PATENT DOCUMENTS 6,041,887 A * 3/2000 Kojo ..................... B60R 25/021
                                                                180/446
6,073,721 A * 6/2000 Grabowski ............ B62D 5/065
                                                                180/422

(Continued)

FOREIGN PATENT DOCUMENTS

DE    102007024489 A1    11/2008
DE    102010032043 A1    1/2012

(Continued)

OTHER PUBLICATIONS

International Search Report issued Jul. 4, 2013 re: PCT/FR2013/050516; citing: U.S. Pat. No. 6,408,235 B1, DE 10 2007 024489 A1, DE 10 2010 032043 A1, WO 2007/093875 A2 and FR 2 811 628 A1.

Primary Examiner — Stephen Holwerda
(74) Attorney, Agent, or Firm — Oliff PLC

(57) ABSTRACT

A method for controlling a steering system having an electric assistance motor in view of reducing shocks against end-of-travel stop, the method including getting a distance information of the rack with respect to the end of travel stop, getting an actual rotation speed information of the steering wheel, identifying a maximum allowed acceleration for the steering wheel, the maximum allowed acceleration being such that, in view of the distance information and the actual rotation speed information, the rotation speed of the steering wheel can decrease pursuant to a target deceleration value of a target deceleration profile so as to be lower than a required maximal speed when arriving at the end-of-travel stop, determining a maximum power assistance torque from the maximum allowed acceleration for controlling the power assistance torque applied to the assistance motor so as to target the deceleration value or profile of the rotation of the steering wheel.

8 Claims, 1 Drawing Sheet

(56) References Cited

U.S. PATENT DOCUMENTS

| | | | |
|---|---|---|---|
| 6,408,235 B1* | 6/2002 | Tanke, II | B62D 5/0469 180/443 |
| 2003/0024758 A1* | 2/2003 | Fujita | B62D 5/065 180/422 |
| 2005/0082107 A1* | 4/2005 | Husain | B62D 5/005 180/402 |
| 2008/0033613 A1* | 2/2008 | Tamaizumi | B62D 5/0463 701/41 |

FOREIGN PATENT DOCUMENTS

| | | |
|---|---|---|
| FR | 2810614 A1 | 12/2001 |
| FR | 2811628 A1 | 1/2002 |
| WO | 2007093875 A2 | 8/2007 |

* cited by examiner

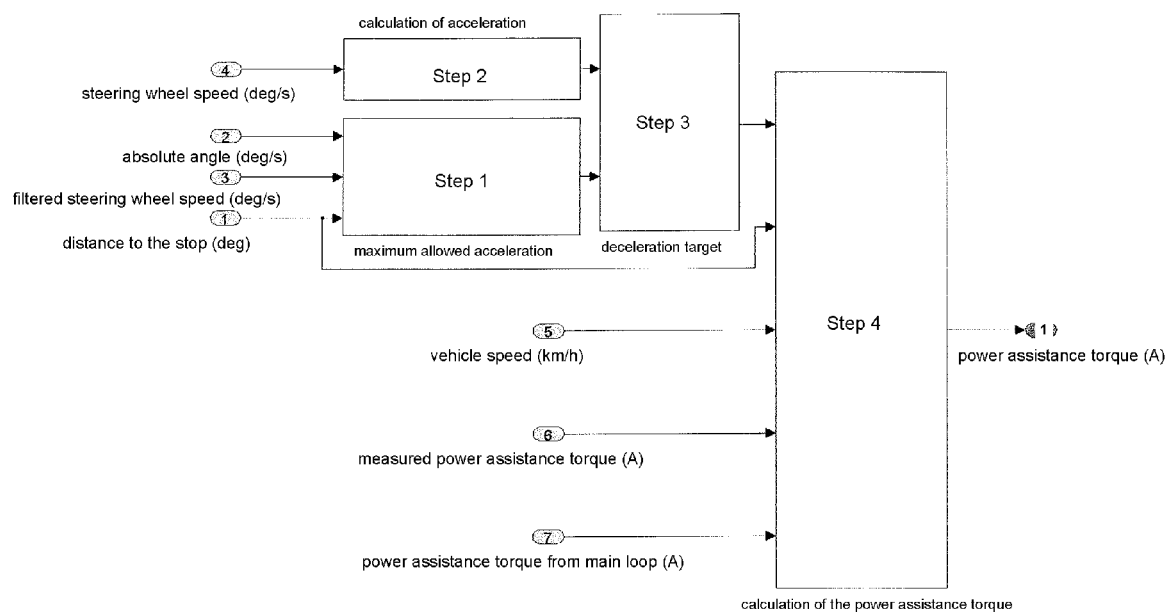

METHOD FOR CONTROLLING END OF TRAVEL FOR ELECTRIC POWER-ASSISTED STEERING

TECHNICAL FIELD

The present invention relates, in general, to the steering systems of motor vehicles, and more particularly the electric power-assisted steering systems. Still more particularly, this invention relates to a method which, in such steering systems, carries out a control of end of travel of the rack, in particular in order to limit the shocks and the noise when the steering system reaches the steering lock stop.

BACKGROUND

An electric power-assisted steering of a motor vehicle has an electric power assistance motor, by which a torque or a force, amplifying the effort manually exerted by the driver of the vehicle on the steering wheel, is applied on the steering column or on the steering pinion, or even directly on the rack. When the assistance function is used, an electric current with a more or less important intensity flows through the windings of the electric power assistance motor, the intensity of this electric current depending on various parameters, according to preset "laws of power assistance".

In certain driving or operating circumstances of a motor vehicle, the rack hits a mechanic end of travel stop, with a relatively high speed. This results in shock and noise. In fact, the reaching of the mechanic stop causes a very sudden deceleration, the speed of the rack moving from a high value to zero over a very short distance, thus corresponding to a vibratory excitement of the steering system, just like a "hammer blow".

These undesirable effects are amplified in the case of a power-assisted steering if the laws of power assistance are not adapted to such a situation of arrival at the end of travel.

French Patent FR 2 810 614 already proposes to electronically control the maximum intensity of the electric current flowing through the power assistance motor, based on the value of the rotation angle of the steering wheel or of an equivalent quantity provided by a sensor, so as to reduce or limit this maximum intensity when the steering system reaches the steering lock stop.

More particularly, the French patent 2 810 614 provides that an electronic control device, particularly an electronic computer, reduces the maximum intensity of the electric current flowing through the power assistance motor based on the rotation angle of the steering wheel or an equivalent quantity, according to a programmed curve. This maximum intensity may thus continuously decrease, beyond a predetermined rotation angle of the steering wheel, to a reduced value applied when the steering lock stop is reached.

This known method is particularly intended, to reduce the intensity of the electric current flowing through the power assistance motor, when the end of travel position is maintained, so as to preserve the power assistance motor by avoiding an excessive heating of the latter. However, such a method does not take into account dynamic parameters such as the speed of rotation of the wheel, in order to also reduce the shocks and noise at the end of travel.

The U.S. Pat. No. 6,408,235 patent discloses a similar method, in which not only the rotation angle of the steering wheel, but also the angular speed of the steering wheel can be taken into account, the actual angular speed being compared with a "target" angular speed and the power assistance torque being adapted based on the difference of these speeds, in a closed loop control. Thus, the end of travel shocks can to a certain extent, be reduced.

BRIEF SUMMARY

The purpose of the present invention is to improve the aforementioned known methods, so as to better still reduce the shocks and noise at the end of travel, by exerting an action better adapted to concrete encountered situations.

To this end, the invention relates to a method for controlling end of travel, for a steering rack of a motor vehicle with electric power assistance, a method in which the maximum intensity of the electric current flowing through the electric power assistance motor is controlled to adapt the power assistance torque, at the approach of end of travel positions of the rack, so as to reduce the shocks and noise when the steering system reaches the steering lock stop, this method being substantially characterized in that the control of the power assistance torque, at the approach of the end of travel positions, is carried out or activated based on parameters including the acceleration value of the rotation of the steering wheel, and by controlling the power assistance torque so as to target a deceleration value or profile of the rotation of the steering wheel.

Thus, the principle of the invention is based on a regulation in deceleration target, rather than in position or speed, which allows:

on the one hand, to act earlier and to be more effective in the case where the driver of the vehicle tends to accelerate the rotation movement of the steering wheel towards the stop;

on the other hand, to exert a smoother and gentler action, providing a more natural feel of the movement by the driver.

Particularly, the method purpose of the invention does not alter in any way the feel of the driver if the latter carries out a lock away from the stop or if he does it at the approach of the stop but in a sufficiently gentle manner, hence without violent acceleration. Thus, the steering wheel operating is not "burdened" unnecessarily.

In one preferred implementation of the method of the invention, the specific function of the power assistance torque control, at the approach of end of travel positions, is activated in case of an acceleration of the rotation of the steering wheel higher than a threshold value, and by short-circuiting a main loop for controlling the power assistance torque.

In other words, the specific function of the invention is implemented by an independent loop, and is not assimilated to a simple modulation of the power assistance torque initially determined (it does not comprise a multiplication of the power assistance torque by a weighting coefficient, as described in aforementioned patent FR 2 810 614). Furthermore, the action of this independent loop, in other words, the specific function of the invention, may advantageously be based on the measured power assistance torque, in particular at the time of the entry into operation of this function.

This allows, if necessary, to completely cancel the power assistance and even to possibly produce a counter-assistance, to be effective in all cases, from the viewpoint of reducing end of travel shocks and noises (which is not possible with a simple multiplication by a weighting coefficient). Particularly, the effectiveness of the "anti-noise" action is the same in case of high adhesion and in case of low adhesion, for example on snow. The action remains the same, regardless of the laws of the main power assistance loop and regardless of the value of the efforts applied by the undercarriage of the vehicle on the steering rods. Such function independence also facilitates its development and adaptation.

BRIEF DESCRIPTION OF THE DRAWING

Anyway, the invention will be better understood with the help of the following description, with reference to the accompanying schematic drawing of which the sole FIGURE illustrates, by way of example, an implementation of the herein described end of travel control method.

DETAILED DESCRIPTION

The method of the invention comprises a preliminary step (not shown) of determining the positions of the two mechanic end of travel stops of the rack, by calculating the absolute distance with respect to the stop to which the rack is the closest, based on a position information provided by an encoder associated with the electric power assistance motor, or by an angular position sensor of the steering wheel or of the steering column.

More particularly, in the case where it is provided an absolute angular position information of the steering wheel coming from a sensor external to the steering system, such as a sensor on the steering column, this absolute angle information is used by recording during the initial uses of the vehicle, upon the operations of the latter, the highest and lowest of the scanned angular values. When the difference between the highest value and the lowest value reaches a value which corresponds to the known total travel of the rack, since it comprises a specific size defined by the dimensions of the steering gear box the average of the highest value and the lowest value is determined and this average is recorded as an offset or correction to be applied to the angle of the steering wheel or the steering column, this angular offset corresponding to a distance offset (correction to be applied to the distance of the rack relatively to the two end of travel stops).

If it is provided only the relative angle provided by an encoder associated with the electric power assistance motor, a specific function allows detecting, after each vehicle start-up, if the rack abuts, thus by simultaneous observation of several significant information:

torque at the torsion bar higher than a threshold, rotation speed of the steering wheel lower than a threshold and angular torque gradient at the torsion bar. If the requested conditions are fulfilled, the stop positions hence also the possible offset of the real stop angle with respect to the relative angle provided by the encoder are known. Thus the angular or linear distance of the rack with respect to an end-travel stop can be recreated.

This preliminary step being carried out, the actual method is conducted according to the steps described below.

In a first step, using a table of values and based on the distance information of the rack with respect to the mechanic stop, as well as the actual rotation speed information of the steering wheel, it is identified the maximum allowed acceleration for the rotation of the steering wheel, such that the steering wheel speed is lower than a required maximum speed at the arrival at the stop in order to prevent noise, by respecting a gentle deceleration profile for the feel of the driver.

In a second step, the actual acceleration of the steering wheel is calculated, based on the speed information of the actual steering wheel rotation, able to be provided with high accuracy, with little measurement noise and with a rapid sampling by an encoder associated with the electric power assistance motor.

In a third step, the current acceleration of the steering wheel (obtained in the second step) is compared with the maximum allowed acceleration (obtained in the first step), to obtain a deviation which is converted, via gains, to a decrease target of the power assistance torque on a time step.

In a fourth step it is checked whether the authorization conditions for activating the function are fulfilled, namely:

as a first condition: that the absolute distance of the rack with respect to the mechanic stop is lower than a threshold value (in other words: the function is only active in a "close to the stop" area);

as a second condition: that the vehicle speed be lower than a threshold value (in other words: the function is only active in conditions of low speed of the vehicle).

If these two conditions are simultaneously met, a maximum power assistance value given by the actual power assistance torque is determined, from which the decrease target of the power assistance torque obtained in the third stage is subtracted. The branch for computing this maximum power assistance value is independent from the main branch for controlling power assistance torque.

The power assistance target from the main branch is thus saturated at the aforementioned maximum value and this new power assistance target is transmitted to the electric power assistance motor.

The unique FIGURE of the accompanying drawing illustrates, in a simplified manner, the method of the invention with its four aforementioned steps.

As it is known per se, the invention is not limited to a single implementation described above but encompasses on the contrary, all alternatives following the same principle, in particular regardless of the nature and position of the sensors used for obtaining information to be used.

The invention claimed is:

1. A method for controlling end of travel, for a steering rack of a motor vehicle with electric power assistance, a method in which the maximum intensity of the electric current flowing through the electric power assistance motor is controlled to adapt a power assistance torque, at the approach of the end of travel positions of the rack, so as to reduce the shocks and noise when the steering system reaches a steering end-of-travel stop, said method comprising a specific function including:

getting a distance information of the rack with respect to the end of travel stop, getting an actual rotation speed information of the steering wheel, identifying a maximum allowed acceleration for the rotation of the steering wheel, said maximum allowed acceleration being such that, in view of the distance information of the rack and the actual rotation speed information of the steering wheel, the rotation speed of the steering wheel will be lower than a required maximal speed when arriving at the end-of-travel stop, in respecting a target deceleration value or a target deceleration profile, determining a maximum power assistance torque from the maximum allowed acceleration; and controlling the power assistance torque so as to target the deceleration value or profile of the rotation of the steering wheel.

2. The method for controlling end of travel according to claim 1, comprising a main loop for controlling the power assistance torque, said main loop comprising providing a power assistance torque target according to assistance laws, while the specific function is implemented by a second loop and wherein said specific function is activated on a first condition that the absolute distance of the rack with respect to the end-of-travel stop is lower than a threshold value when approaching an end of travel position, and provided that the actual acceleration of the rotation of the steering wheel is higher than a threshold value, and further wherein said specific function, when activated, short-circuits the main loop so as to provide a new power assistance torque target to the assistance motor.

3. The method for controlling end of travel according to claim 2, wherein said specific function comprises measuring the actual power assistance torque, in particular at the time of the entry into operation of this function, so that said specific function achieves computing the maximum power assistance torque independently from the main loop.

4. The method for controlling end of travel according to claim 2, wherein said specific function is activated on a second condition that the vehicle speed is lower than a threshold value.

5. The method for controlling end of travel according to claim 1, further comprising a preliminary step of determining the positions of the two mechanic end of travel stops of the rack, by calculating the absolute distance with respect to the stop to which the rack is the closest, based on a position information provided by an encoder associated with the electric power assistance motor, or by an angular position sensor of the steering wheel or of the steering column.

6. The method of claim 1 comprising:
getting an actual rotation acceleration of the steering wheel,
comparing the actual rotation acceleration of the steering wheel with the maximum allowed acceleration, so as to obtain a deviation,
converting the deviation into a decrease target of the power assistance torque, and
determining a maximum power assistance torque by subtracting the decrease target of the power assistance torque from an actual power assistance torque.

7. The method of claim 1 wherein getting an actual rotation acceleration of the steering wheel comprises calculating said actual rotation acceleration from the actual rotation speed information.

8. The method of claim 2 wherein short-circuiting the main loop is achieved in saturating the power assistance torque target outputted by the main loop with the maximum power assistance torque computed by the second loop.

* * * * *